United States Patent
Chen

(10) Patent No.: US 8,773,983 B2
(45) Date of Patent: Jul. 8, 2014

(54) EVOLVED MULTIMEDIA BROADCAST MULTICAST SERVICE SYSTEM AND METHOD FOR PERFORMING STATISTICAL MULTIPLEXING OF SERVICES WITH DIFFERENT QUALITY OF SERVICE CLASS IDENTIFIERS

(75) Inventor: Yu Chen, Shanghai (CN)

(73) Assignee: Alcatel Lucent, Paris (FR)

( * ) Notice: Subject to any disclaimer, the term of this patent is extended or adjusted under 35 U.S.C. 154(b) by 144 days.

(21) Appl. No.: 13/389,719

(22) PCT Filed: Aug. 11, 2009

(86) PCT No.: PCT/CN2009/000918
§ 371 (c)(1),
(2), (4) Date: Feb. 9, 2012

(87) PCT Pub. No.: WO2011/017821
PCT Pub. Date: Feb. 17, 2011

(65) Prior Publication Data
US 2012/0140619 A1    Jun. 7, 2012

(51) Int. Cl.
*H04L 12/24* (2006.01)
*H04W 4/06* (2009.01)

(52) U.S. Cl.
CPC ................................. *H04W 4/06* (2013.01)
USPC .......................................... 370/229; 370/312

(58) Field of Classification Search
None
See application file for complete search history.

(56) References Cited

U.S. PATENT DOCUMENTS

| 2012/0069785 | A1* | 3/2012 | Zhang et al. | 370/312 |
| 2012/0263089 | A1* | 10/2012 | Gupta et al. | 370/312 |

FOREIGN PATENT DOCUMENTS

| CN | 101262326 A | 9/2008 |
| CN | 101370157 A | 2/2009 |
| CN | 101420769 A | 4/2009 |

OTHER PUBLICATIONS

Alcatel-Lucent, "ABBR based statistical multiplexing solution for e-MBMS", R3-091300, May 4-8, 2009.*
Yu Chen "Statistical multiplexing for LTE MBMS in dynamic service deployment", May 2008.*
Alcatel-Lucent, "E-MBMS functions of statistical multiplexing", R3-071797, Oct. 8-11, 2007.*
Alcatel-Lucent, "E-MBMS functions of statistical multiplexing", R3-071454, Aug. 20-24, 2007.*
International Search Report for PCT/CN2009/000918 dated May 20, 2010.

* cited by examiner

*Primary Examiner* — Hassan Kizou
*Assistant Examiner* — Tejis Daya
(74) *Attorney, Agent, or Firm* — Fay Sharpe LLP

(57) ABSTRACT

A method for performing statistical multiplexing of services with different Quality of Service Class Identifiers (QCIs) in an evolved Multimedia Broadcast Multicast Service (e-MBMS) system, comprising: at an evolved Broadcast Multicast Service Center (eBM-SC), determining a statistical multiplexing bundle and information of the statistical multiplexing bundle for e-MBMS services, wherein the statistical multiplexing bundle comprises multiple services with different QCIs, and services with the same QCI constitute a statistical multiplexing sub-bundle in the statistical multiplexing bundle, the information of the statistical multiplexing bundle comprising: a QCI, a service list and an Aggregated Bundle Bit Rate (ABBR) of each statistical multiplexing sub-bundle, and the ABBR of the statistical multiplexing bundle; at an MBMS Collaborative Entity (MCE), determining an ABBR bundle based on the information of the statistical multiplexing bundle determined by the eBM-SC and according to a predetermined standard, and performing statistical multiplexing scheduling for the services of the ABBR bundle so that multiple services belonging to the same ABBR bundle share resources allocated to the ABBR bundle. The method may acquire further gain, that is, further reduce resource consumption.

15 Claims, 4 Drawing Sheets

EVOLVED MULTIMEDIA BROADCAST MULTICAST SERVICE SYSTEM AND METHOD FOR PERFORMING STATISTICAL MULTIPLEXING OF SERVICES WITH DIFFERENT QUALITY OF SERVICE CLASS IDENTIFIERS

FIELD OF THE INVENTION

The present invention relates to a multicast broadcast service, and more specifically to an evolved Multimedia Broadcast Multicast Service (e-MBMS) system and method for performing statistical multiplexing of services with different Quality of Service Class Identifiers (QCIs).

BACKGROUND OF THE INVENTION

Today, with the rapid development of mobile technology, a large number of multimedia services emerge. In some application services, multiple users can simultaneously receive the same data, such as video on demand, television broadcast, video conference, mobile TV, etc. In order to efficiently utilize mobile network resources, WCDMA/GSM global standardization organization 3GPP puts forward a Multimedia Broadcast Multicast Service (MBMS)/an evolved Multimedia Broadcast Multicast Service (e-MBMS). The MBMS/e-MBMS refers to a point-to-multipoint service in which data are transmitted from a single data source to multiple users to share network resources. The MBMS/e-MBMS defined by 3GPP enables not only multicast and broadcast of plain text, low rate messages, but also multicast and broadcast of high-rate multimedia services, which undoubtedly conforms to the development trend of future mobile data.

In addition, statistical multiplexing technology is widely used in a multi-stream transmission system. Multiplexing parallel streams results in considerable a multiplexing gain. The multiplexing gain is achieved by statistics of services, i.e. when one of the streams needs more bandwidths, some other streams will statistically undergo a low bit rate state. Statistical multiplexing is applicable to a broadcasting system because a gain is achieved by utilizing application statistics characters rather than others like physical layer feedback. The multiplexing gain is quite considerable, e.g. it has been found that a gain of 30%-40% can be achieved in DVB-H.

Thus, it is necessary to perform statistical multiplexing in the MBMS/e-MBMS system to achieve higher efficiency of resource utilization.

The basic concept of performing statistical multiplexing of the services with the same Quality of Service Class Identifier (QCI) has been proposed.

FIG. 1 illustrates a schematic diagram of the existing evolved Multimedia Broadcast Multicast Service (e-MBMS) system for performing statistical multiplexing of services with the same QCI.

QCI comprises parameters such as bit rate, bit error rate, requirement on delay and priority level required by achieving the Quality of Service Level of services.

An evolved Broadcast Multicast Service Center (eBM-SC) achieves provision and management of the MBMS service. For a content provider, BM-SC is an entrance of the MBMS service content. For a bearer network, eBM-SC is in charge of authorizing and initiating e-MBMS services/and scheduling and transmitting e-MBMS service contents.

As shown in FIG. 1, eBM-SC firstly acquires statistical parameters of services with the same QCI, and determines a statistical multiplexing bundle and information of the statistical multiplexing bundle, wherein the information of the statistical multiplexing bundle may include: a list of services within the bundle represented for example by a list of a Temporal Mobile Group Identify (TMGI), the QCI requested by the statistical multiplexing bundle and the Aggregated Bundle Bit Rate (ABBR) of the statistical multiplexing bundle. Then, eBM-SC informs an encoder of the ABBR so that the encoder can make joint encoding of multiple services in the aggregated bundle; the total code rate of data streams of multiple services can keep constant; and these services can rationally share the total code rate. The eBM-SC transmits the information of the statistical multiplexing bundle via a gateway to MBMS Collaborative Entity (MCE) so that the MCE can perform resource allocation. On the allocated resources, via MAC multiplexing, eNodeB multiplexes IP packets to the same Transmission Block (TB) to multiplex the services to the same Multicast Channel (MCH).

FIG. 2 illustrates a schematic diagram of the existing method for performing statistical multiplexing of the services with the same QCI.

For a case including service stream 1 (QCI1), service stream 2 (QCI1), service stream 3 (QCI2), service stream 4 (QCI3) and service stream 5 (QCI4), eBM-SC firstly determines statistical multiplexing bundle 1 {service stream 1 (QCI1), service stream 2 (QCI1)}, statistical multiplexing bundle 2; {service stream 3 (QCI2)}, statistical multiplexing bundle 3 {service stream 4 (QCI3)} and statistical multiplexing bundle 4 {service stream 5 (QCI4)} and their respective $ABBRs_{bundle}$ (ABBRs of the statistical multiplexing bundles), and controls the encoder to perform encoding. Based on the statistical multiplexing bundle 1 {service stream 1 (QCI1), service stream 2 (QCI1)}, statistical multiplexing bundle 2 {service stream 3 (QCI2)}, statistical multiplexing bundle 3 {service stream 4 (QCI3)} and statistical multiplexing bundle 4 {service stream 5 (QCI4)} and their respective $ABBRs_{bundle}$ determined by the eBM-SC, MCE performs resource allocation and allocates services of different bundles to different MCHs.

The signaling structure employed by the method is as follows:

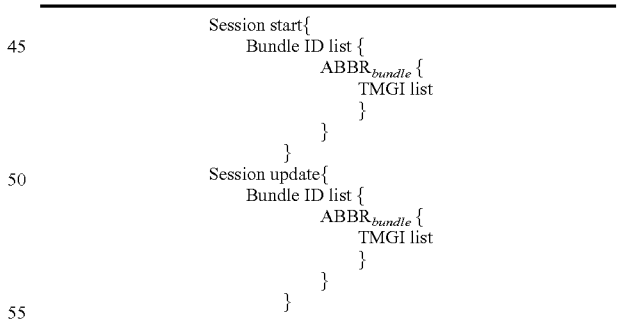

A study has found that the output of the joint encoded multiplexing stream of services with the same QCI is similar to a Constant Bit Rate (CBR) service. FIG. 3 is a schematic diagram illustrating the relationship between the allocated bit rate and the real-time bit rate of the CBR service. As shown in FIG. 3, a study result shows that the real-time bit rate of CBR is not constant, but with some changes, which however, will further provide a multiplexing gain.

FIG. 4 is a simulation chart illustrating the multiplexing gain of 4 CBR services. As shown in FIG. 4, the multiplexing gain of 4 CBR services may approach 16%. For a 5M bandwidth, it is equivalent to 800 Kbps. The inventor of the present invention has recognized that the multiplexing gain of multiple CBR services is quite considerable.

Hence, the inventor arrives at the following findings:

1. The more services are multiplexed, the higher gain can be achieved.

2. If the Internet Service Provider (ISP) chooses to joint-encode the services with the same QCI, for services with different QCIs, this will produce multiple joint-encoded streams each for one QCI respectively, and multiplexing gain will be produced when these streams are multiplexed together.

Accordingly, there is provided an evolved Multimedia Broadcast Multicast Service system and method for performing statistical multiplexing of services with different QCIs to further increase the system capacity.

SUMMARY OF THE INVENTION

It is an object of the present invention to perform effective statistical multiplexing of the services with different QCIs in an evolved Multimedia Broadcast Multicast Service (e-MBMS) system to further improve the efficiency of the system.

According to one aspect of the present invention, there is provided a method for performing statistical multiplexing of services with different Quality of Service Class Identifiers (QCIs) in an evolved Multimedia Broadcast Multicast Service (e-MBMS) system, comprising: at an evolved Broadcast Multicast Service Center (eBM-SC), determining a statistical multiplexing bundle and information of the statistical multiplexing bundle for e-MBMS services, wherein the statistical multiplexing bundle is constituted by multiple services with different QCIs, and services with the same QCI constitute a statistical multiplexing sub-bundle in the statistical multiplexing bundle, the information of the statistical multiplexing bundle comprising: a QCI, a service list and an Aggregated Bundle Bit Rate (ABBR) of each statistical multiplexing sub-bundle, and the ABBR of the statistical multiplexing bundle; at an MBMS Collaborative Entity (MCE), determining an ABBR bundle based on the information of the statistical multiplexing bundle determined by eBM-SC and according to a predetermined standard, and performing statistical multiplexing scheduling for the services of the ABBR bundle so that multiple services belonging to the same ABBR bundle share resources allocated to the ABBR bundle.

Preferably, the eBM-SC determines the statistical multiplexing bundle according to the following condition: services have the same requirement on bit error rate.

Preferably, the MCE determines the ABBR bundle according to the following standards: 1) services have the same priority level; and/or 2) services have the same requirement on delay.

Preferably, the eBM-SC transmits the information of the statistical multiplexing bundle via a gateway to the MCE by a Session Start message.

Preferably, the eBM-SC is configurable to add a new service to an existing statistical multiplexing bundle, and/or to remove a completed service from the existing statistical multiplexing bundle.

Preferably, in the case that a service is added or removed, at the eBM-SC, the information of the statistical multiplexing bundle is re-determined and is transmitted to the MCE, and at the MCE, the ABBR bundle is re-determined.

Preferably, the eBM-SC informs the MCE of service addition/removal by a Session Start/Session Stop message.

Preferably, the eBM-SC transmits the re-determined information of the statistical multiplexing bundle to MCE by a Session Update message.

According to a second aspect of the present invention, there is provided an evolved Multimedia Broadcast Multicast Service (e-MBMS) system, comprising: an evolved Broadcast Multicast Service Center (eBM-SC) configured to determine a statistical multiplexing bundle and information of the statistical multiplexing bundle for e-MBMS services, wherein the statistical multiplexing bundle comprises multiple services with different QCIs, and services with the same QCI constitute a statistical multiplexing sub-bundle in the statistical multiplexing bundle, the information of the statistical multiplexing bundle comprising: a QCI, a service list and an Aggregated Bundle Bit Rate (ABBR) of each statistical multiplexing sub-bundle, and an ABBR of the statistical multiplexing bundle; and an MBMS Collaborative Entity (MCE) configured to determine an ABBR bundle based on the information of the statistical multiplexing bundle determined by eBM-SC and according to the predetermined standard, and to perform statistical multiplexing scheduling for the services of the ABBR bundle so that the multiple services belonging to the same ABBR bundle share resources allocated to the ABBR bundle.

Preferably, the eBM-SC comprises: a parameter acquiring means configured to acquire a statistical parameter of the eMBMS service; and a statistical multiplexing bundle and information of the statistical multiplexing bundle determining means configured to determine a statistical multiplexing bundle and information of the statistical multiplexing bundle in accordance with the statistical parameter acquired by the parameter acquiring means.

Preferably, the eBM-SC further comprises: an encoder coordination means configured to perform rate control coordination between application encoders for services.

Preferably, the MCE comprises: a parameter extracting means configured to extract the QCI, the service list and the Aggregated Bundle Bit Rate (ABBR) of a statistical multiplexing sub-bundle, and the ABBR of the statistical multiplexing bundle; and an ABBR bundle multiplexing means configured to determine an ABBR bundle based on the parameter extracted by the parameter extracting means and according to the predetermined standard, and to perform statistical multiplexing scheduling for the services of the ABBR bundle so that multiple services belonging to the same ABBR bundle share the resources allocated to the ABBR bundle.

Preferably, the eBM-SC determines the statistical multiplexing bundle according to the following condition: services have the same requirement on bit error rate.

Preferably, the MCE determines the ABBR bundle according to the following standards: 1) services have the same priority level; and/or 2) services have the same requirement on delay.

Preferably, the eBM-SC transmits the information of the statistical multiplexing bundle via a gateway to the MCE by a Session Start message; the eBM-SC informs MCE of service addition/removal by a Session Start/Session Stop message; and/or the eBM-SC transmits the re-determined information of the statistical multiplexing bundle to the MCE by a Session Update message.

Preferably, the e-MBMS system is a mobile TV system.

By using the solution of the present invention, resources can be shared among services with different QCIs to further increase the system capacity.

BRIEF DESCRIPTION OF THE DRAWINGS

The above and other objects, features and advantages of the present invention will become clearer by making references to the following detailed description of nonrestrictive embodiments of the present invention in conjunction with the accompanying drawings, in which.

DETAILED DESCRIPTION OF EMBODIMENTS

Embodiments of the present invention are now described in detail with reference to the accompanying drawings. In the following descriptions, some specific embodiments are only used for description purposes and they shall not be construed as any limitation on the present invention, but merely examples of the present invention. It needs to be pointed out that the schematic diagrams only illustrate the difference from the existing system while omit the conventional structure or composition to avoid a vague understanding of the present invention.

Figure 5:
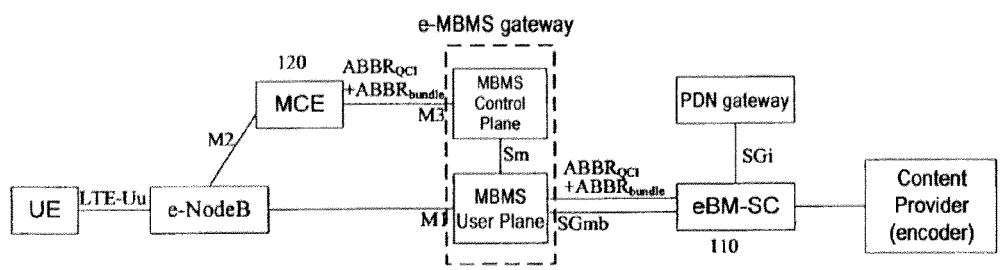
FIG. 5 illustrates a schematic block diagram of an e-MBMS system for performing statistical multiplexing of services with different QCIs according to the present invention.

FIG. 5 illustrates a schematic block diagram of an e-MBMS system for performing statistical multiplexing of services with different QCIs according to the present invention.

As shown in FIG. 5, the e-MBMS system comprises a content provider (having an encoder), an evolved Broadcast Multicast Service Center (eBM-SC) 110, MCE 120 and Base Station (eNB), etc., The e-MBMS system according to the present invention certainly further comprises the components included in the existing e-MBMS system, such as PDN gateway, e-MBMS gateway, User Equipment (UE), etc. so as to achieve the existing functions of the e-MBMS system. Here, FIG. 5 only shows the components related to the functions of the present invention to avoid causing the present invention unclear.

The shown components can also perform further statistical multiplexing of services to improve the efficiency of the system, in addition to achieving the functions of the existing e-MBMS system.

An encoder receives and encodes contents from a content provider server, and provides the encoded contents to the eBM-SC 110.

The eBM-SC 110 receives and transmits the encoded e-MBMS contents.

According to one aspect of the present invention, the eBM-SC 110 further performs the configuration of statistical multiplexing except performing the eBM-SC functions in conventional technique because the eBM-SC 110 can learn information of services. For example, in the case of mobile TV, the eBM-SC 110 can learn information of required TV channel combination. For example, the eBM-SC 110 can learn service areas, and can learn and possibly control the statistical characteristics of user service streams, e.g. whether the coding is a Constant Bit Rate (CBR) or Variable Bit Rate (VBR), and whether the encoder is MPEG4 or H.264.

Figure 6:
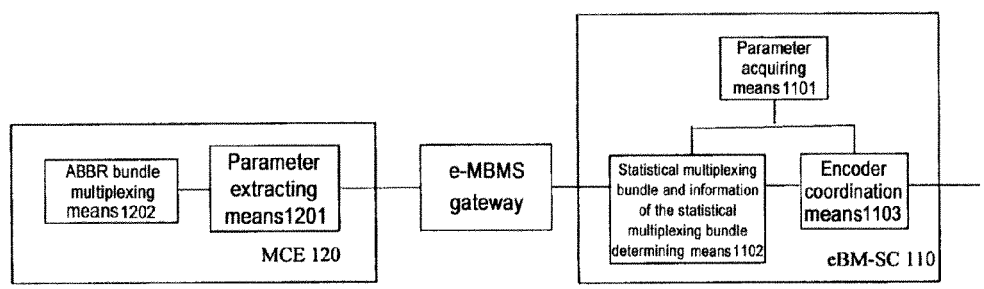
FIG. 6 illustrates an embodiment of an e-MBMS system for performing statistical multiplexing of services with different QCIs according to the present invention.

FIG. 6 illustrates an embodiment of an e-MBMS system for performing statistical multiplexing of services with different QCIs according to the present invention.

According to one aspect of the present invention, the eBM-SC 110 comprises a parameter acquiring means 1101, a statistical multiplexing bundle and information of the statistical multiplexing bundle determining means 1102. The parameter acquiring means 1101 as mentioned above is used for acquiring statistical parameters of services to thereby obtain information of service combination, and the statistical multiplexing bundle and information of the statistical multiplexing bundle determining means 1102 is used for determining a statistical multiplexing bundle and information of the statistical multiplexing bundle in accordance with the parameters acquired by the parameter acquiring means.

The determined statistical multiplexing bundle comprises services with different QCIs, while services with the same QCI constitute a statistical multiplexing sub-bundle. The information of the statistical multiplexing bundle may include a QCI, a service list, and the ABBR of each statistical multiplexing sub-bundle, and the ABBR of the statistical multiplexing bundle. The service list is represented for example by a list of Temporal Mobile Group Identify (TMGI). The eBM-SC 110 transmits the information to the MCE 120 via the eMBMS gateway.

According to one aspect of the present invention, the eBM-SC 110 may further include an encoder coordination means 1103 for performing rate control coordination between application encoders for stream services so that the encoder may generate VBR service traffic but the aggregated bit rate may keep constant.

The MCE 120 determines ABBR bundles in accordance with the information of the statistical multiplexing bundle transmitted from the eBM-SC 110, and performs statistical multiplexing scheduling for the services of the ABBR bundle to achieve statistical multiplexing of different services in the same ABBR bundle, i.e. different services share resources. The eNodeB finally will provide a User Equipment (UE) with the services that a user is interested in.

According to one aspect of the present invention, the MCE 120 may include a parameter extracting means 1201 and an ABBR bundle multiplexing means 1202. The parameter extracting means 1201 is configured to extract the information of the statistical multiplexing bundle transmitted from the eBM-SC 110, such as a QCI, a service list and an ABBR of each statistical multiplexing sub-bundle and the ABBR of the statistical multiplexing bundle. The ABBR bundle multiplexing means 1202 is configured to determine an ABBR bundle based on the parameter extracted by the parameter extracting means and according to the predetermined standard, and multiplexing the services belonging to the same ABBR bundle to achieve high efficiency of resource utilization, In the following, the statistical multiplexing method according to the present invention will be described in detail with reference to FIG. 7.

Figure 7:
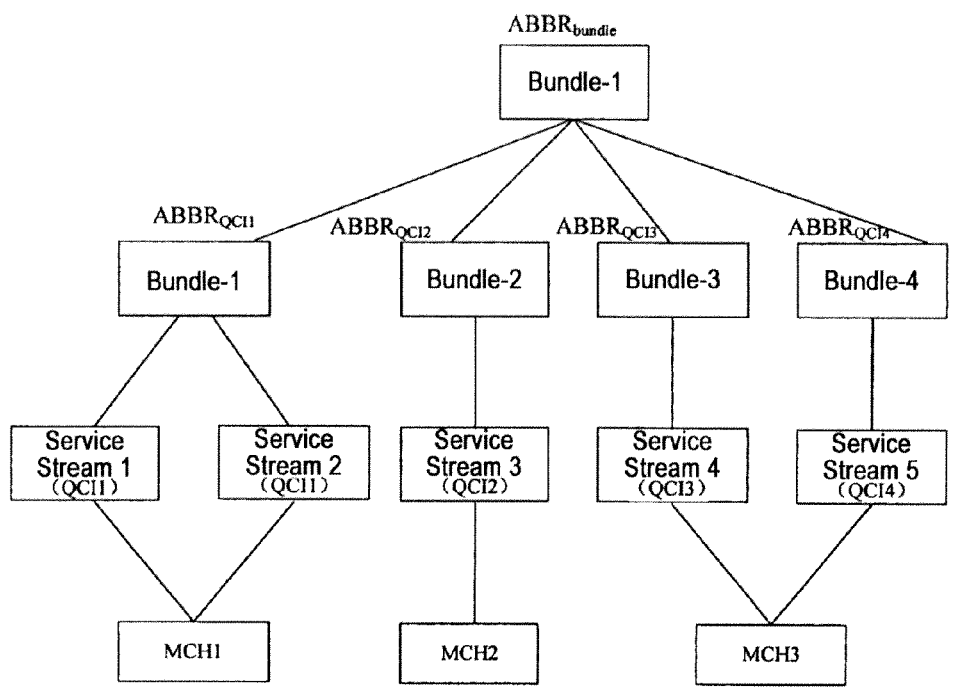
FIG. 7 illustrates a schematic diagram of a method for performing statistical multiplexing of services with the same QCI according to the present invention.

FIG. 7 illustrates a schematic diagram of performing the statistical multiplexing operation in the e-MBMS system shown in FIG. 5 according to embodiments of the present invention, Firstly, the eBM-SC 110 determines a statistical multiplexing bundle to and information of the statistical multiplexing bundle by using the statistical multiplexing bundle and information of the statistical multiplexing bundle determining means and in accordance with the statistical parameters of services acquired by the parameter acquiring means. For example, the eBM-SC 110 may enable the services having the same bit error rates to constitute a statistical multiplexing bundle.

After a statistical multiplexing bundle is determined, the eBM-SC 110 determines the services having the same QCI within the bundle to be a sub-bundle, and determines the $ABBRs_{QCI}$ of the sub-bundles (ABBRs of statistical multiplexing sub-bundles) and the $ABBR_{bundle}$ of the entire statistical multiplexing bundle in accordance with the requirements of service deployments including available bandwidth, the bit rate of services required to meet customer satisfaction, etc.

Then, the eBM-SC 110 configures an encoder. The encoder controls the output bit rate of the service by a joint encoding algorithm so that the sum of the output bit rates of the services of the statistical multiplexing sub-bundles can be approximately equal to $ABBR_{QCI}$, and the sum of the output bit rates of all services of the statistical multiplexing bundle can be approximately equal to $ABBR_{bundle}$. The specific joint encoding algorithm may employ the existing joint encoding technique.

The information of the statistical multiplexing bundle determined by the eBM-SC 110 can be transmitted to the MCE 120 via the Session Start message for each service.

The signaling structure of the information of the statistical multiplexing bundle according to the present invention is as follows:

```
Session start{
    Bundle ID list {
        ABBR_bundle
        QCI list {
            ABBR_QCI
            TMGI list
        }
    }
}
Session update{
    Bundle ID list {
        ABBR_bundle
        QCI list {
            ABBR_QCI
            TMGI list
        }
    }
}
```

The eBM-SC 110 may add a new service to the statistical multiplexing bundle, and may also remove a completed service from the bundle. When the eBM-SC 110 adds/removes a service, MCE 120 may be informed for example via the Session Start message/Session Stop message. When the statistical multiplexing bundle changes, e.g. a new service is added to or a completed service is removed from, the eBM-SC 110 needs to re-determine the statistical multiplexing bundle and information of the statistical multiplexing bundle. The information may be transmitted to MCE 120 via a Session Update message, and the MCE 120 may simultaneously perform scheduling in accordance with new information of the statistical multiplexing bundle, which can be performed by the following simple mechanism, for example, carrying a timestamp indicating next scheduling interval in the Session Update message or the resource reference allocation message.

The MCE 120 determines an ABBR bundle based on the information of the statistical multiplexing bundle transmitted from the eBM-SC 110 and according to a predetermined standard, and the determined ABBR bundle comprises multiple statistical multiplexing sub-bundles. The MCE 120 performs resource allocation for the services in the ABBR bundle based on $ABBRs_{QCI}$ of the statistical multiplexing sub-bundles included in the determined ABBR bundle and $ABBR_{bundle}$ of the entire statistical multiplexing bundle. Services belonging to the same ABBR bundle share the resources allocated to the bundle. Different services are scheduled, i.e. multiplexed based on the resource allocation scheme of the ABBR bundle.

For example, the MCE 120 can determine the ABBR bundle in accordance with the following standards:
1. Services have the same priority level, and/or
2. Services have the same requirement on delay.

The following explains are made by taking the situations discussed about the existing technique as an example. The standard is assumed to be services having the same priority level.

For the above case including service stream 1 (QCI1), service stream 2 (QCI1), service stream 3 (QCI2), service stream 4 (QCI3) and service stream 5 (QCI4), the services with the same QCI, accordingly the same priority level, are multiplexed on the same MCH, i.e. the services within one statistical multiplexing sub-bundle are multiplexed on the same MCH, and the MCE 120 allocates resources in accordance with the QCI and the Aggregated Bundle Bit Rate, i.e. $ABBRs_{QCI}$, of the corresponding statistical multiplexing sub-bundle. For example, in the case that the Aggregated Bundle Bit Rate of the corresponding statistical multiplexing sub-bundle of one QCI, i.e. $ABBR_{QCI}$ is 600 kbps, the MCE allocates resources of 600 kbps.

In accordance with the specified standard, the MCE further multiplexes the services with different QCIs and the same priority level on the same MCH, when the resources allocated by the MCH are the sum of $ABBRs_{QCI}$ of the statistical multiplexing sub-bundles corresponding to the two QCIs.

For example, it is assumed that the service stream 4 (QCI3) and service stream 5 (QCI4) have the same priority level, but different QCIs. Then, after detecting that the priority levels of the service stream 4 and service stream 5 are the same, the MCE 120 allocates the service stream 4 and service stream 5 on the same MCH3 as shown in FIG. 7, and allocates resources of $(ABBR_{QCI3}+ABBR_{QCI4})$.

In addition, the MCE 120 may be further optimized. Multiplexing gain of services will increase on every increase of one service, and the specific increase can be obtained based on the analysis of long-term statistics and service models, during which the $ABBR_{bundle}$ can be referred to.

A simple algorithm is:

$$\delta = \frac{\sum_{i=1}^{N} ABBR_{QCI_i}}{ABBR_{bundle}} - 1,$$

where δ is a further multiplexing gain obtained by the method for multiplexing a bundle of services with different QCIs according to the present invention.

For example, if δ=5% a then the MCE can allocate (ABBR$_{QCI3}$+ABBR$_{QCI4}$)*0.95 to the MCH3.

Since such an estimation is not very accurate, certain margin may be appropriately added for compensation.

Certainly, the MCE 120 may also map all service streams to the same MCH, when the ABBR$_{bundle}$ is used for a resource allocation reference. The MCE is developed by different vendors, while the resource allocation and channel allocation algorithms are internal algorithms. Thus the MCE will, in accordance with the algorithms set by vendors, perform resource allocation and channel allocation and perform statistical multiplexing scheduling for the services.

Figure 1:
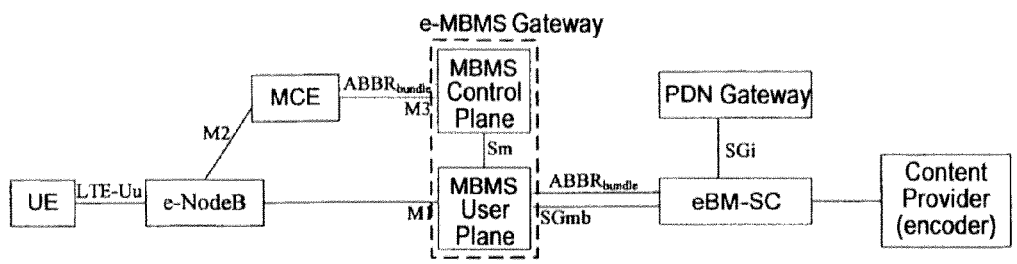
FIG. 1 illustrates a schematic diagram of the existing evolved Multimedia Broadcast Multicast Service (e-MBMS) system for performing statistical multiplexing of services with the same QCI.
Figure 2:
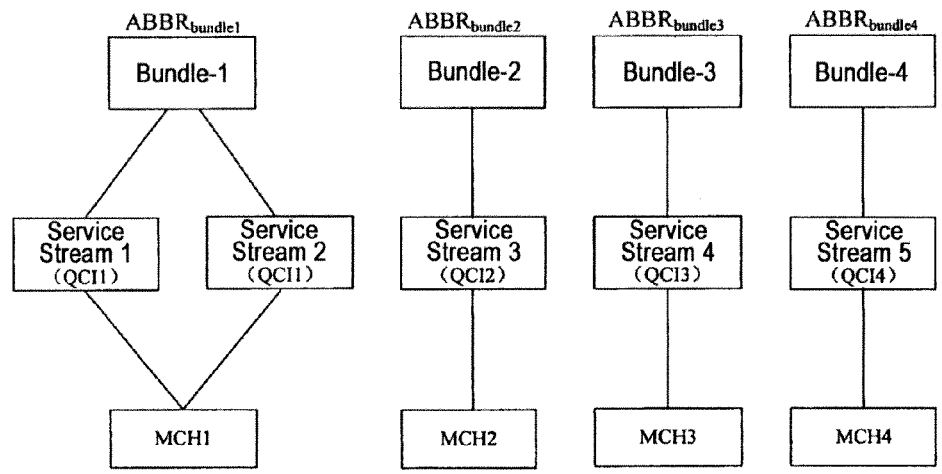
FIG. 2 illustrates a schematic diagram of the existing method for performing statistical multiplexing of services with the same QCI.
Figure 3:
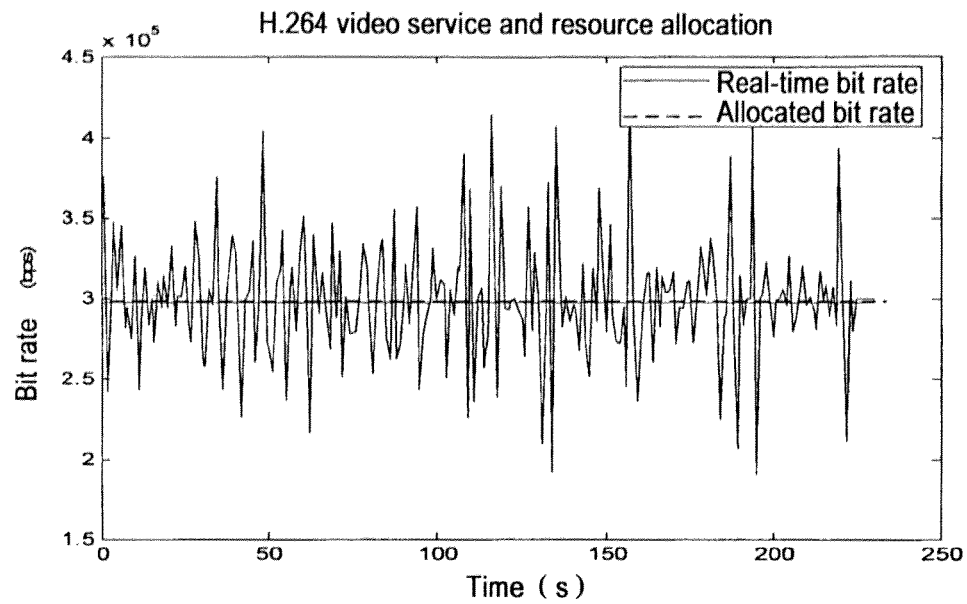
FIG. 3 is a schematic diagram illustrating the relationship between the allocated bit rate and the real-time bit rate of the CBR service.
Figure 4:
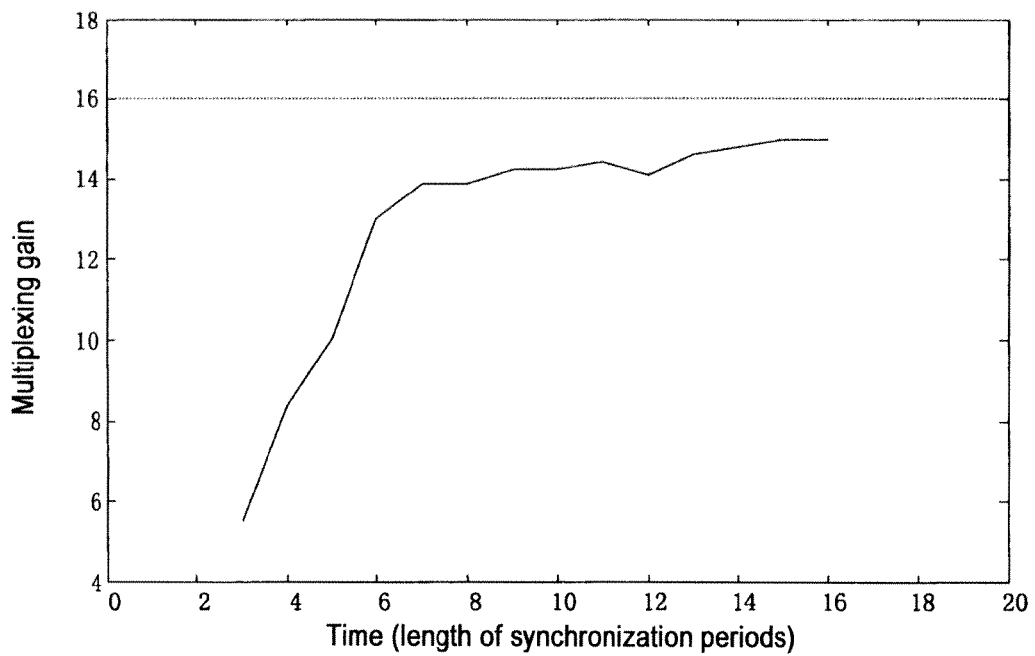
FIG. 4 is a simulation chart illustrating the multiplexing gain of multiple CBR services.

FIG. 4 is a simulation chart illustrating the multiplexing gain of 4 CBR services.

It can be seen from FIG. 4 that the method for performing statistical multiplexing of the CBR services with 4 different QCIs according to the present invention may acquire a gain of nearly 16%, that is, reduce 16% resource consumption. Certainly, the statistical multiplexing gain achieved by the present invention changes with the number of multiplexed services, service data, channel conditions, etc.

According to the present invention, performing statistical multiplexing of services with different QCIs further produces the multiplexing gain and reduces resource consumption.

Embodiments described above are only used for exemplary purposes, not to limit the scope of the present invention. It should be understood by those skilled in the art that various modifications and changes in terms of form and detail can be carried out on these embodiments without departure from the scope and spirit of the present invention. The scope of the present invention is defined by the appended claims and their equivalents.

What is claimed is:

1. A method for performing statistical multiplexing of services with different Quality of Service Class Identifiers (QCIs) in an evolved Multimedia Broadcast Multicast Service e-MBMS system, comprising:
   at an evolved Broadcast Multicast Service Center eBM-SC, determining a statistical multiplexing bundle and information of the statistical multiplexing bundle for e-MBMS services, wherein the statistical multiplexing bundle comprises multiple services with different QCIs, and services with the same QCI constitute a statistical multiplexing sub-bundle in the statistical multiplexing bundle, the information of the statistical multiplexing bundle comprising: a QCI for each e-MBMS service in the statistical multiplexinq bundle, a service list and an Aggregated Bundle Bit Rate ABBR of each statistical multiplexing sub-bundle, and an ABBR of the statistical multiplexing bundle;
   at an MBMS Collaborative Entity MCE, determining an ABBR bundle based on the information of the statistical multiplexing bundle determined by eBM-SC and according to a predetermined standard, and performing statistical multiplexing scheduling for the services of the ABBR bundle so that multiple services belonging to the same ABBR bundle share resources allocated to the ABBR bundle.

2. The method according to claim 1, wherein the eBM-SC determines the statistical multiplexing bundle according to the following condition: services have the same requirement on bit error rate.

3. The method according to claim 1, wherein the MCE determines the ABBR bundle according to the following standards:
   1) services have the same priority level; and/or
   2) services have the same requirement on delay.

4. The method according to claim 1, wherein the eBM-SC transmits the information of the statistical multiplexing bundle via a gateway to the MCE by a Session Start message.

5. The method according to claim 1, wherein the eBM-SC is configurable to add a new service to an existing statistical multiplexing bundle, and/or to remove a completed service from the existing statistical multiplexing bundle.

6. The method according to claim 5, wherein in the case that a service is added or removed, at the eBM-SC, the information of the statistical multiplexing bundle is re-determined and is transmitted to the MCE, and at the MCE, the ABBR bundle is re-determined.

7. The method according to claim 6, wherein the eBM-SC informs the MCE of service addition/removal by a Session Start/Session Stop message.

8. The method according to claim 7, wherein the eBM-SC transmits the re-determined information of the statistical multiplexing bundle to the MCE by a Session Update message.

9. An evolved Multimedia Broadcast Multicast Service e-MBMS system, comprising:
   an evolved Broadcast Multicast Service Center eBM-SC configured to determine a statistical multiplexing bundle and information of the statistical multiplexing bundle for e-MBMS services, wherein the statistical multiplexing bundle comprises multiple services with different Quality of Service Class Identifiers (QCIs), and services with the same QCI constitute a statistical multiplexing sub-bundle in the statistical multiplexing bundle, the information of the statistical multiplexing bundle comprising: a QCI for each e-MBMS service in the statistical multiplexing bundle, a service list and an Aggregated Bundle Bit Rate ABBR of each statistical multiplexing sub-bundle, and an ABBR of the statistical multiplexing bundle; and
   an MBMS Collaborative Entity MCE configured to determine an ABBR bundle based on the information of the statistical multiplexing bundle determined by the eBM-SC and according to a predetermined standard, and to perform statistical multiplexing scheduling for the services of the ABBR bundle so that the multiple services belonging to the same ABBR bundle share resources allocated to the ABBR bundle.

10. The e-MBMS system according to claim 9, wherein the eBM-SC is further configured to:
    acquire a statistical parameter of the eMBMS service; and
    determine a statistical multiplexing bundle and information of the statistical multiplexing bundle in accordance with the acquired statistical parameter.

11. The e-MBMS system according to claim 10, wherein the eBM-SC is further configured to:
    perform rate control coordination between application encoders for services.

12. The e-MBMS system according to claim 9, wherein the MCE is further configured to:
    extract the QCI, the service list and the Aggregated Bundle Bit Rate ABBR of a statistical multiplexing sub-bundle, and the ABBR of the statistical multiplexing bundle; and
    determine the ABBR bundle based on the extracted parameter and according to the predetermined standard, and to perform statistical multiplexing scheduling for the services of the ABBR bundle so that multiple services belonging to the same ABBR bundle share the resources allocated to the ABBR bundle.

13. The e-MBMS system according to claim 9, wherein the eBM-SC determines the statistical multiplexing bundle according to the following condition: services have the same requirement on bit error rate.

14. The e-MBMS system according to claim 9, wherein the MCE determines the ABBR bundle according to the following standards:
 1) services have the same priority level; and/or
 2) services have the same requirement on delay.

15. The e-MBMS system according to claim 9, wherein
 the eBM-SC transmits the information of the statistical multiplexing bundle via a gateway to the MCE by a Session Start message;
 the eBM-SC informs the MCE of service addition/removal by a Session Start/Session Stop message; and/or
 the eBM-SC transmits the re-determined information of the statistical multiplexing bundle to the MCE by a Session Update message.

* * * * *